United States Patent
Connolly et al.

(10) Patent No.: US 12,381,622 B2
(45) Date of Patent: Aug. 5, 2025

(54) SYSTEMS AND METHODS TO CO-LOCATE RFID READER NETWORKS WITH IN-BAND SENSOR NETWORKS

(71) Applicant: ZEBRA TECHNOLOGIES CORPORATION, Lincolnshire, IL (US)

(72) Inventors: Sean Connolly, Stony Brook, NY (US); Mark W. Duron, Mastic, NY (US); Jimmy Chabra, Massapequa, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 672 days.

(21) Appl. No.: 16/678,409

(22) Filed: Nov. 8, 2019

(65) Prior Publication Data
US 2021/0143902 A1 May 13, 2021

(51) Int. Cl.
*H04B 7/26* (2006.01)
*G06K 7/10* (2006.01)
*G06K 19/07* (2006.01)

(52) U.S. Cl.
CPC ....... *H04B 7/2618* (2013.01); *G06K 7/10079* (2013.01); *G06K 19/0723* (2013.01); *H04B 7/2656* (2013.01); *G06K 7/10366* (2013.01)

(58) Field of Classification Search
None
See application file for complete search history.

(56) References Cited

U.S. PATENT DOCUMENTS

| | | | | |
|---|---|---|---|---|
| 6,975,582 | B1 * | 12/2005 | Karabinis | H04B 7/18563 370/347 |
| 7,302,256 | B1 * | 11/2007 | O'Hara, Jr. | H04W 40/246 455/418 |
| 8,446,884 | B2 * | 5/2013 | Petite | H04B 1/406 370/335 |
| 10,986,387 | B1 * | 4/2021 | Parulkar | H04N 21/23439 |
| 2002/0126013 | A1 * | 9/2002 | Bridgelall | G01S 11/02 340/572.1 |
| 2002/0183979 | A1 * | 12/2002 | Wildman | G07C 9/28 702/188 |

(Continued)

FOREIGN PATENT DOCUMENTS

JP   2019108222 A   * 7/2019

OTHER PUBLICATIONS

JP 2019-108222 (Year: 2019).*

(Continued)

*Primary Examiner* — Christopher T Wyllie

(57) ABSTRACT

Systems and methods to co-locate RFID readers with in-band sensor networks, such as LoRa sensor networks, are disclosed herein. An example arrangement is a co-located device that includes a dual-mode transceiver configured to communicate with targets operating in a first protocol (e.g., RFID) and other targets operating in a second protocol (e.g., LoRa). The example arrangement includes a dual-mode controller that operates the dual-mode transceiver to communicate via the first protocol during a first time period while disabling communication via the second protocol and to communicate via the second protocol in a second time period while disabling communication via the first protocol.

17 Claims, 6 Drawing Sheets

(56) References Cited

U.S. PATENT DOCUMENTS

| | | | | |
|---|---|---|---|---|
| 2005/0206555 | A1* | 9/2005 | Bridgelall | G01S 13/46 340/8.1 |
| 2007/0057057 | A1* | 3/2007 | Andresky | G06K 7/10356 340/10.1 |
| 2008/0088417 | A1* | 4/2008 | Smith | G06K 19/0712 340/572.1 |
| 2009/0199300 | A1* | 8/2009 | Matsubara | H04W 12/50 726/26 |
| 2010/0026454 | A1* | 2/2010 | Rowse | G06Q 20/327 340/10.1 |
| 2010/0080177 | A1* | 4/2010 | Rofougaran | H04W 76/15 370/329 |
| 2011/0307305 | A1* | 12/2011 | Kohli | G07B 15/063 705/13 |
| 2016/0239001 | A1* | 8/2016 | Chin | G07C 9/00 |
| 2018/0348329 | A1* | 12/2018 | Schuehler | H01Q 25/02 |
| 2019/0223136 | A1* | 7/2019 | Miermont | G01S 13/825 |
| 2022/0110008 | A1* | 4/2022 | Knouse | H04W 4/12 |
| 2023/0206761 | A1* | 6/2023 | Mangialardi | G08G 1/095 340/931 |

OTHER PUBLICATIONS

International Search Report and Written Opinion for International Application No. PCT/US2020/050848 mailed on Dec. 7, 2020.

* cited by examiner

SYSTEMS AND METHODS TO CO-LOCATE RFID READER NETWORKS WITH IN-BAND SENSOR NETWORKS

BACKGROUND

Radio frequency identification (RFID) devices are used in many environments to locate and track targets, such as, personnel in hospitals, merchandise moving through a shipping warehouse, and inventory stored in retail environments. RFID devices, such as RFID tags, are located and tracked using RFID readers dispersed within the environment.

Increasingly, RFID readers are often operated within environments that also employ other communication devices and associated networks. Unfortunately, when operating a large number of RFID readers in an environment, the number of available communication channels needed for these non-RFID networks limits the performance of non-RFID sensors to unacceptable levels. Given the nature of RFID networks, there is little "RE Quiet" time for a non-RFID sensor to send back a message to its gateway (e.g., access point) without interference. Because, the typical RFID reader needs to be able to transit at power levels that far exceed the transmit power levels of a battery powered sensor, the non-RFID sensors and gateways are usually desensitized and only able to successfully communicate when energy from the RFID reader is not present. The result is that non-RFID sensors must be able to respond to their sensor gateways over very short windows of time and often must transmit multiple times to achieve minimum system performance. Yet, the presence of other communications devices and networks considerably increases signal interference over these short time windows degrading performance.

SUMMARY

In an embodiment, the present invention is a dual-mode arrangement for in-band communication according to a first protocol and to a second protocol. The arrangement comprises: a dual-mode transceiver configured to communicate with targets operating according to the first protocol and configured to receive signals from targets operating in the second protocol; a dual-mode controller coupled to the dual-mode transceiver and configured to operate the dual-mode transceiver to communicate with the targets operating according to the first protocol during a first time period and configured to operate the dual-mode transceiver to receive signals from the targets operating according to the second protocol in a second time period, wherein the dual mode controller is further configured to prevent the dual-mode transceiver from communicating with the targets operating according to the first protocol during the second time period and further configured to prevent the dual-mode transceiver from receiving the signals from the targets operating according to the second protocol during the first time period.

In a variation of this embodiment, the dual-mode controller is configured to switch the dual-mode transceiver between operation in the first time period and in the second time period, based on the first protocol and the second protocol.

In another variation of this embodiment, the dual-mode controller is configured to establish a length of the first time period and a length of the second time period based on a signal quality of signals communicated according to the first protocol and a signal quality of signals received according to the second protocol.

In another variation of this embodiment, the first protocol is a radio frequency identification (RFID) protocol and the targets operating according to the first protocol are RFID tags, and wherein the second protocol is a Long Range (LoRa) protocol and the targets operating according to the second protocol are LoRa sensors.

In another embodiment, the present invention is a system comprising: a plurality of dual-mode transceiver stations within the venue, each dual-mode transceiver station configured to communicate with targets operating according to a first protocol in a venue during a first time period and configured to receive signals from targets operating in a second protocol in the venue during a second time period, wherein each dual-mode transceiver station is further configured to prevent communicating with the targets operating according to the first protocol during the second time period and to prevent receiving the signals from the targets operating according to the second protocol during the first time period; and a controller coupled to each of the plurality of dual-mode transceivers and configured to switch operation each of the plurality of the dual-mode transceivers between the first time period and the second time period in response to a determination of venue-based metrics determined from the targets operating according to the first protocol and/or from the targets operating according to the second protocol in the venue.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
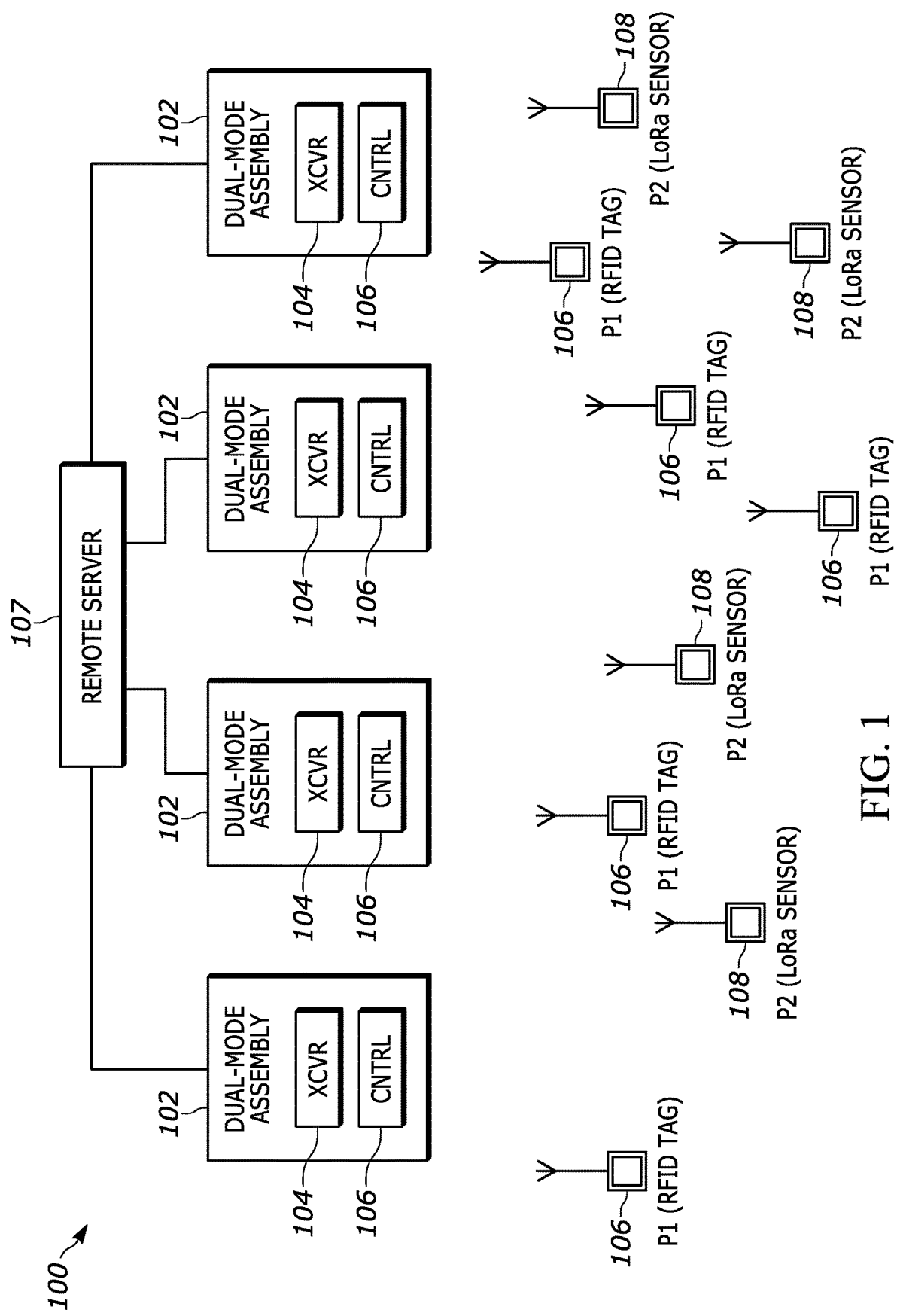
FIG. 1 is a block diagram of an example environment having a plurality of dual-mode devices for communicating with a plurality of different targets in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various embodiments of the present disclosure, a system, and related methods, are described for a dual-mode arrangement for in-band communication according to first and second protocols within an environment. In various embodiments, an arrangement includes a dual-mode transceiver that is configured to communicate with targets operating according to the first protocol and configured to receive signals from targets operating in the second protocol. A dual-mode controller may be coupled to the dual-mode transceiver and configured to operate the dual-mode transceiver to communicate with the targets operating according to the first protocol during a first time period. Further the dual-mode controller may be configured to operate the dual-mode transceiver to receive signals from the targets operating according to the second protocol in a second time period.

In various embodiments, the dual mode controller is configured to prevent the dual-mode transceiver from communicating with the targets operating according to the first protocol during the second time period and further configured to prevent the dual-mode transceiver from receiving the signals from the targets operating according to the second protocol during the first time period.

In this way, the present techniques provide for arrangements in which targets that communicate according to different protocols can be effectively communicated with, even within the same environment, without having to deploy complex interference reductions techniques. But controlling operation of a dual-mode transceiver in the accordance with the present techniques, a single type of transceiver can communicate with multiple different targets, operating with different protocols, without the dual-mode transceiver experiencing undue interference during communications. As a result, targets may be operated at different protocols, even where those targets communicate over in-band frequencies that are partially overlapping with in-band frequencies of other targets.

In various embodiments, the dual-mode controller switches a dual-mode transceiver between operating in the first time period and operating in the second time period. In some embodiments the switching that occurs is based on the types of first and second protocols that the dual-mode transceiver is to communicate over. In various embodiments, the dual-mode controller establishes a length of the first time period and a length of the second time period based on a signal quality of signals communicated according to the first protocol and a signal quality of signals received according to the second protocol.

In various embodiments, the first protocol is a radio frequency identification (RFID) protocol; and the targets operating according to the first protocol are RFID tags. In various embodiments, the second protocol is a Long Range (LoRa) protocol; and the targets operating according to the second protocol are LoRa sensors.

FIG. 1 is a block diagram of an example environment 100 having a plurality of dual-mode arrangements 102 for communicating with a plurality of different targets, those targets including targets configured under different protocols. The dual-mode arrangements 102 each contain a dual-mode transceiver (XCVR) 104 able to transmit over multiple different protocols and a dual-mode controller 106 for controlling operation thereof. The dual-mode arrangements 102 may be coupled to a remote server 107, which may be a network-accessible processing device configured to synchronize operation across the dual-mode arrangements 102. Within the environment, the dual-mode arrangements 102 are able to communicate with a first type of target 106, configured according to a first protocol, P1, such as a RFID protocol, and a second type of target 108, configured according to a second protocol, P2, such as a LoRa protocol.

Figure 2:
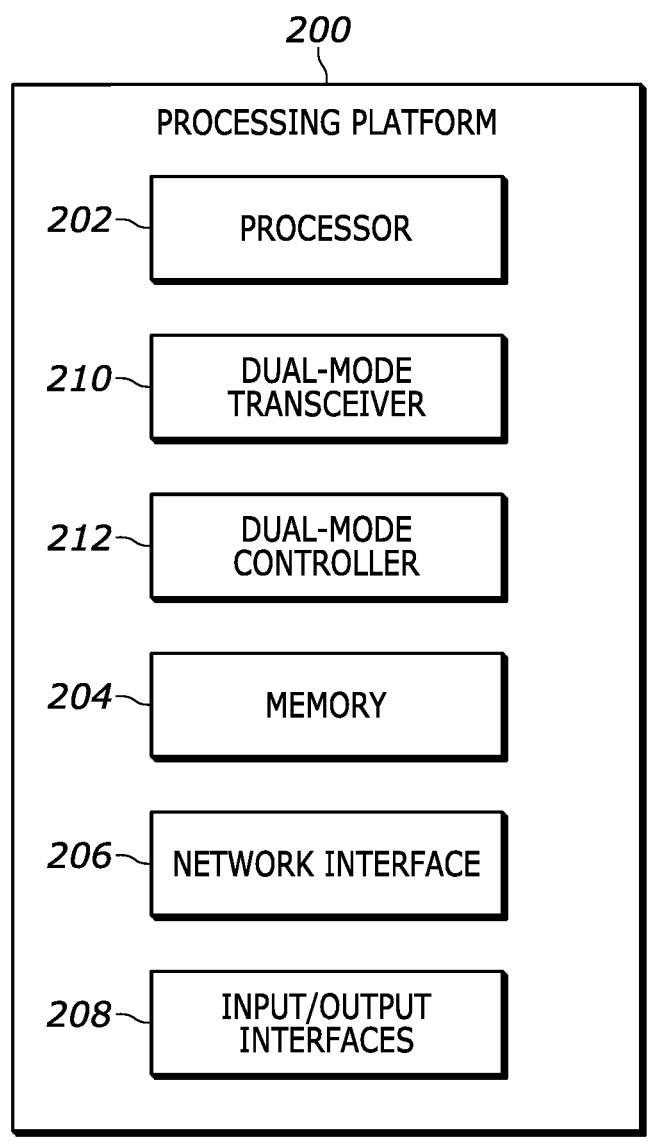
FIG. 2 is a block diagram of an example logic circuit for implementing example methods and/or operations described herein.

FIG. 2 is a block diagram representative of an example logic circuit capable of implementing, for example, one or more components of an example dual-mode arrangement for in-band communication according to two or more protocols of FIG. 1. FIG. 2, for example, provides a representation of a dual-mode transceiver with dual-mode controller implementing example processes, as described herein, including those of the dual-mode arrangements 102 of FIG. 1. The example logic circuit of FIG. 2 is a processing platform 200 capable of executing instructions to, for example, implement operations of the example methods described herein, as may be represented by the flowcharts of the drawings that accompany this description and other processes of this disclosure. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts and other processes of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s).

The example processing platform 200 of FIG. 2 also includes input/output (I/O) interfaces 208 to enable receipt of user input and communication of output data to the user.

The example processing platform 200 of FIG. 2 also includes a dual-mode transceiver 210 and a dual-mode controller 212, both of which may be configured to perform operations represented by the flowcharts and other processes of this disclosure as described herein. The dual-mode transceiver 210 and dual-mode controller 212 may be implemented by the processor 202 and memory 204, in some embodiments. In other embodiments, the dual-mode transceiver 210 and dual-mode controller 212 may be implemented by a dedicated logic circuit and memory within the transceiver 210 (not shown). In other embodiments the dual-mode transceiver 210 and dual-mode controller 212 may be implemented by some combination thereof.

In various embodiments, to communicate with multiple different targets of different protocols, e.g., as described in reference to FIG. 1, the dual-mode transceiver 210 is configured to communicate both with targets operating according to a first protocol and with targets operating according to a second protocol. The first and second protocols may differ in a number of different ways.

In some examples, the protocols herein differ in that one protocol is a reader-initiated protocol, where a dual-mode reader/gateway device sends a downlink signal to wake up a sensor from which the sensor responds, and the other reader is a sensor-initiated protocol, where the sensor sends an uplink signal without polling from a dual-mode reader/gateway downlink signal. The RFID protocol is an example reader-initiated protocol. An example RFID protocol is UHF EPC "Gent" protocol. The LoRa protocol, in certain class configurations is an example sensor-initiated protocol. For example, in some class configurations, the LoRa protocol operates where a LoRa sensor "wakes up" due to an event and transmits an uplink signal to a LoRa gateway. In other class configurations, the LoRa protocol operates where a LoRa sensor and the LoRa gateway "wake up" at the same time. In yet other class configurations, the LoRa protocol operates where the LoRa gateway sends a "wake up" downlink signal to the LoRa sensor, which responds by waking up and sending a responsive uplink signal.

In some examples, the protocols herein differ in that one protocol is bi-directional and another is uni-directional. In some examples, the protocols are both bi-directional or both uni-directional, but differ in other ways. In some examples, the protocols differ based modulation scheme they use, e.g., where they use time-based modulation, frequency-based modulation, or code-based modulation. In some examples, the protocols may additional differ in channelization and/or the frequency bands they use, although generally speaking the protocols have at least partially overlapping frequency bands.

In any event, in the various embodiments, the dual-mode transceiver 210 is configured to achieve communication according to at least two protocols, as described.

In various embodiments, the dual-mode controller 212 is coupled to the dual-mode transceiver 210 and configured to operate the dual-mode transceiver 210 to communicate with the targets operating according to the first protocol during a first time period. Further, to control operation of the dual-mode transceiver 210 to prevent or substantially reduce interference between communicating with targets of different protocols, the dual-mode controller 212 may operate the dual-mode transceiver 210 to receive signals from the targets operating according to the second protocol in a second time period, that is different than the first time period.

In various embodiments, the dual-mode controller 212 is further configured to prevent the dual-mode transceiver 210 from communicating with the targets operating according to the first protocol during the second time period and further configured to prevent the dual-mode transceiver from receiving the signals from the targets operating according to the second protocol during the first time period.

Figure 3:
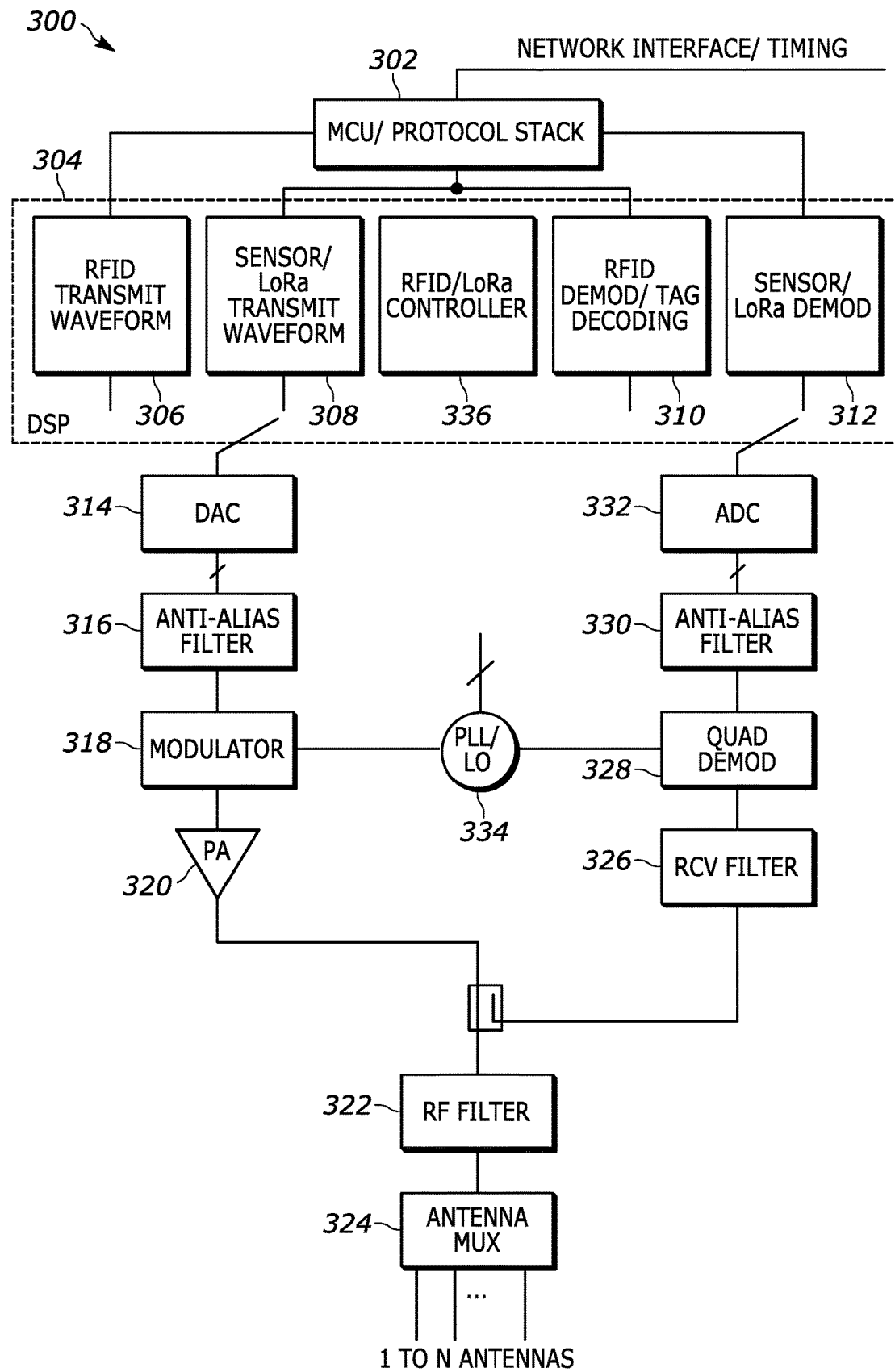
FIG. 3 is a block diagram of a detailed example logic circuit as may be implemented by the logic circuit of FIG. 2.

FIG. 3 is a block diagram representative of an example implementation of the processing platform 200 of FIG. 2, in particular a block diagram representation of the dual-mode transceiver 210 and dual-mode controller 212 of FIG. 2, with the processing platform 200 configured to operate according to an RFID protocol and a LoRa protocol. A dual-mode arrangement 300 includes a microcontroller unit (MCU)/protocol stack 302 communicatively coupled to a network interface (not shown) and configured to control communications between the dual-mode arrangement 300 and network connected devices, such as other dual-mode arrangements, a protocol gateway processing device, and/or a remote server, such as a scheduling processing system, an inventory management processing system, an inventory theft prevention processing system, etc.

The dual-mode arrangement 300 includes a dual-mode controller 304 communicatively coupled to the MCU/protocol stack interface 302. To facilitate communication under first and second protocols, in the illustrated example of FIG. 3, the dual-mode controller 304 includes an RFID waveform generator 306 and a LoRa sensor waveform generator 308, both of which in a transmit signal path of the arrangement 300. The dual-mode controller 304 further includes an RFID waveform demodulator/tag decoder 310 and a LoRa sensor waveform demodulator 312, both in a receive signal path of the arrangement 300. The transmit signal path of the arrangement 300 further includes a digital-to-analog converter 314, anti-alias filter 316, modulator 318, and power amplifier 320 feeding transmit signals to an antenna array through a mutual-path RF filter 322 and antenna multiplexer 324. Depending on the selected waveform generator, during a first time period, the RFID waveform generator 306 feeds an RFID waveform to the DAC converter 314 for transmission on the antenna array. During a second time period, the LoRa sensor waveform generator 308 feeds a LoRA sensor waveform to the DAC converter 314. The receiver signal path includes an RCV filter 326, a quadrature demodulator 328, anti-alias filter 330, and an analog-to-digital converter 332. To establish a common clock between the transmit signal path and the receiver signal path, a phase locked loop (PLL)/local oscillator 334 is coupled between the module 318 and the quadrature demodulator 328.

The RFID protocol communication elements 306, 310 and corresponding RFID tags may operate over a first frequency range, while the LoRa protocol communication elements 308, 312, and LoRa sensors may operate over a second frequency range, different than the first but that at least partially overlaps the first frequency range.

To switch operation between the transmit signal path and the receive signal path at different time periods and to switch operation between the RFID protocol and the LoRa protocol over these different time periods, the dual-mode controller 304 includes an RFID/LoRa switch controller 336. In various embodiments, the dual-mode controller 304 is configured to communicate with the RFID during a first time period and configured to receive signals from LoRa targets during a second time period. The dual-mode controller 304 is further configured to prevent communication with the RFID targets during the second time period, during which signals are received from the LoRa sensor, and further configured to prevent the receipt of LoRa signals during the first time period, in which communication is achieved between the RFID targets and the arrangement 300.

In various embodiments, the RFID/LoRa switch controller 336 controls includes a timing data on the length of the first and second time periods and the starting and stopping times for each to facilitate switching without signal interference.

The dual-mode controller 304 may be implemented wholly or partly in hardware or software. In some examples, the dual-mode controller 304 is implemented as a software defined radio (SDR), which each of the elements shown implemented in software.

Figure 4:
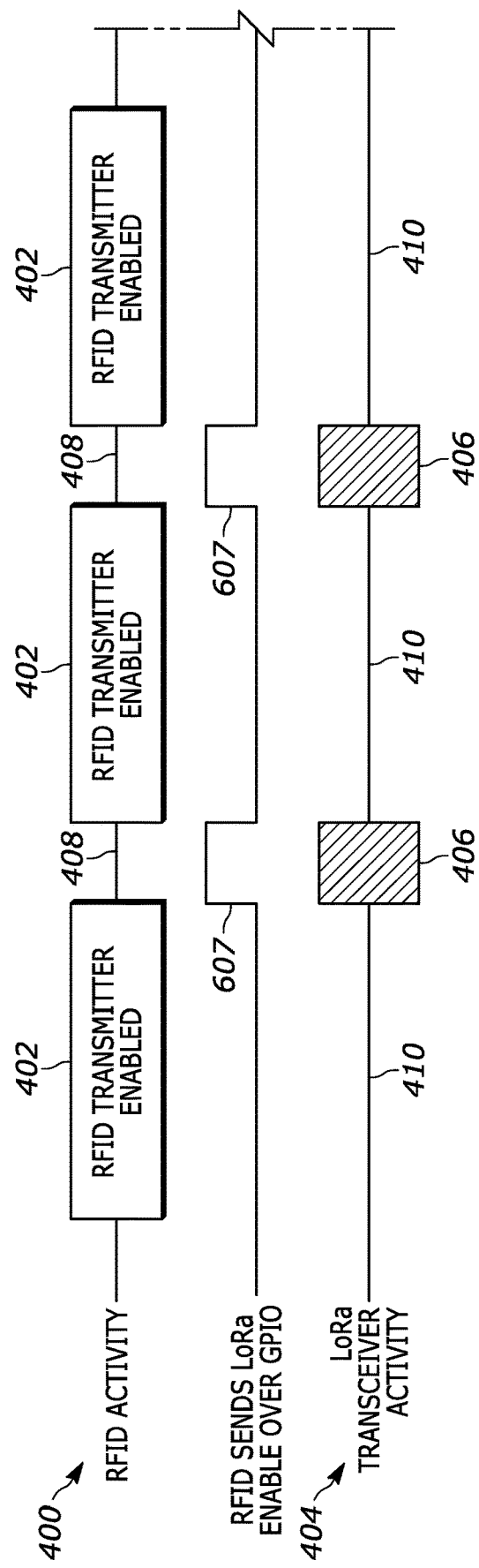
FIG. 4 is a timing diagram of an example operation of the logic circuits of FIGS. 2 and 3.

FIG. 4 illustrates an example timing control that may be implemented by the dual-mode controller 304. For communication with the RFID, a RFID timing protocol 400 is used having a plurality of first time periods 402 of the same length. During the first time period 402, the dual-mode controller 304 controls the RFID waveform generator 306 to transmit an RFID signal to RFID targets within the venue. In some embodiments, the waveform generator 306 may transmit an RFID wake-up signal at the beginning of the first time period instructing the RFID tags receiving the signal to communicate an RFID response signal. Also during the first time period 402, the dual-mode controller 304 controls the RFID waveform demodulator/tag decoder 310 to receive these RFID response signals and decode the tag information contained therein, which information may be used by a connected processing system for locationing and tracking of the corresponding RFID tags.

In some embodiments, the dual-mode controller 304 controls the RFID waveform generator 306 to transmit an energize signal, for example, at the end of the time period 402, to ensure that all RFID tags within range of the arrangement 300 stay energized over a second time period.

During the first time period 402, the dual-mode controller 304 prevents the LoRa sensor waveform generator 308 from generating a LoRa (second protocol) waveform, and further prevents the LoRa sensor waveform demodulator 312 from receiving a LoRa response signal.

To provide a communication path for LoRa signals, the dual-mode controller 304 controls the transmit and receive paths using a second timing protocol 404 formed of a plurality of second time periods 406. In the embodiment shown, the second timing protocol 404 does not overlap with the first timing protocol 400, instead the second time periods 406 overlap with quiet intervals 408 of the first timing protocol 400, just as the first time periods 402 overlap with quiet intervals 410 of the second timing protocol 404.

During the second time periods 406, in some embodiments, the dual-mode controller 304 controls the LoRa sensor waveform generator 308 to generate a LoRa signal which is sent from the arrangement 300, for example a LoRa signal sent to a LoRa gateway (not shown) for locationing and tracking of LoRa sensors. Also during the second time periods 406, the dual-mode controller 304 controls the LoRa sensor waveform demodulator 312 to receive and demodulate LoRa receive signals from LoRa sensors within range of the arrangement 300. During the second time periods 406, the dual-mode controller 304 prevents the RFID waveform generator 306 and RFID waveform demodulator 310 from communication.

In various embodiments, the RFID/LoRa switch controller 336 switches between the time periods 402 and 406 and switches operation of the transmit and receive paths, based on parameters of the two protocols. Different protocols may require different lengths of time to communicate with their corresponding targets. Further, bi-directional protocols, such as RFID protocol, may have longer time periods than other bi-directional protocols, such as a LoRa protocol. The amount of information communicated for each protocol may also affect switching between the first and second time periods. In some examples, the length of the first and second time periods is establish based on the signal quality of each protocol. For example, the dual-mode controller 304 may be configured to measure a signal quality of signals received during each of the first and second protocols, i.e., from RFID tags and LoRa sensors, respectively, and based on the different signal qualities, adjust the length of time of each of the first and second time periods to improve signal quality. For example, to prevent interface with the RFID tags on the uplink (RFID signals received to the arrangement 300, the dual-mode controller 304 may establish a longer time for the second time period 406, long enough to allow the LoRa sensor waveform demodulator 312 to demodulate the received LoRa signal before entering the first time period. The signal quality measure may be signal-to-noise, measure signal strength, or any suitable signal quality metric. The signal quality may be that of only one of the protocol signals or based on the signal qualities of both protocol signals.

In some embodiments, the dual-mode controller 304 may insert spacing time periods between the end of the first time period 402 and the start of the second time period 406 and/or between the end of the second time period 406 and the starts of the first time period 402.

In some embodiments, the length of time of one time period may be controlled by limitations of the protocol operating in the other time period. For example, the length of time of the second time period 406 is preferably shorter than an RFID tag energized time, in some embodiments.

In some embodiments, the length of time of the time periods 402 and 406 is determined based on the number of targets operating under each protocol. For example, the arrangement 300 may enter a set-up mode to determine how many RFID tags transmit signals on a RFID uplink and to determine how many LoRa sensors transmit signals on the LoRa uplink. From there, the arrangement 300 may length or shorten the time periods to allow for sufficient time to communicate with and receive signals from each of the targets within range of the arrangement. In some embodiments, the arrangement 300 may periodically determine how many targets are communicating during each time period and adjust time periods accordingly. In some embodiments, the arrangement 300 may continuously determine the number of targets and adjust time periods accordingly.

To control switching between the first time period/the first protocol and the second time period/second protocol, in some embodiments, the dual-mode controller 304 is configured to switch in response to a received signal from a target. That is, switching may occur on a predetermined timing protocol as shown in FIG. 4. In other embodiments, switching may occur in response to a triggering event, such as upon receipt of a signal from a target during one of the time periods. For example, switching into the second time period may occur only after an RFID tag signal has been received as decoded, or switching may occur only after a particular RFID tag has sent it's RFID signal and the dual-mode controller 304 recognizes that that particular RFID tag ID has been demodulated In some embodiments, the dual-mode controller 304 switches time periods/protocols based on a location of one or more targets within range of the arrangement 300. For example, the dual-mode controller 304 may be configured to receive an RFID signal, decode the RFID tag ID, transmit that tag ID to a location processing system that determines the location of the RFID tag and transmits that location back to the arrangement 300 or transmits some instruction based on that location. Based on the location of the RFID tag, the dual-mode controller 304 may maintain the first time period/first protocol (e.g., even lengthening the first time period), until the RFID tag is determined to be in another location, at which point the dual-mode controller 304 switches to the second time period/second protocol. The dual-mode controller 304 may do similar switching from the second time period/second protocol in response to a determined location of a LoRa sensor, for example, using a LoRa gateway communicatively coupled to the arrangement 300.

In an example, the dual-mode arrangement 300 is implemented as an adapted ISM band transceiver.

In an example embodiment, a dual-mode arrangement may be configured to allow some transmission from a first protocol transceiver during a second time period. For example, in a continuous wave (CW), configuration, a dual-mode arrangement may quiet (i.e., disable) an RFID receiver (such as RFID demodulator 310) during a second time interval, but allow an RFID transmitter (such as RFID modulator 306) to transmit an energize signal during the second time period. This will allow RFID tags to stay energized during the second time period, and this will allow for using a longer second time period. Because only the LoRa receiver would be enabled during the second time period, in this example, the uplink signal will not experience increased interference.

In an example embodiment, a dual-mode arrangement may be configured to enter a second time period at predetermined times, in particular, times associated with the waking of LoRa sensors, which may be programmed to communicate uplink signals at predetermined times.

Figure 5:
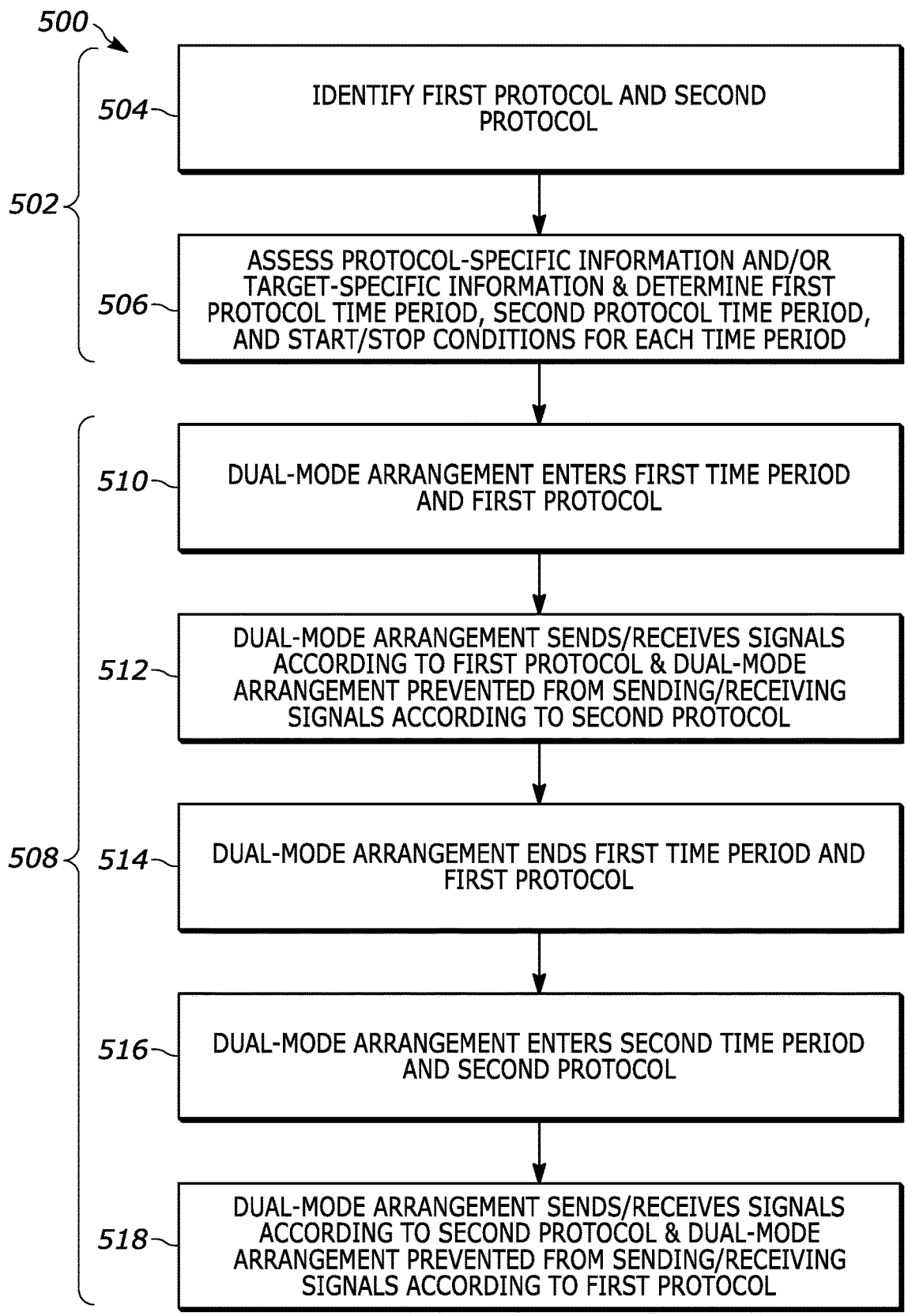
FIG. 5 is a block diagram of an example process as may be implemented by the logic circuits of FIGS. 2 and 3.

FIG. 5 is a block diagram of an example process 500 for in-band communication according to a first protocol and a second protocol in an example embodiment as may be performed by the dual-mode devices of FIGS. 1-3. The process 500 may be performed by a dual-mode arrangement, such as the dual-mode arrangement 300 of FIG. 3. In the illustrated example, the process 500 includes an optional setup process 502 in which the dual-mode arrangement determines the types protocols and the number of protocols that the dual-mode arrangement is to communicate with during operation. In a dual-mode arrangement having a software defined radio (SDR) configuration, for example, the dual-mode arrangement may store a plurality of different protocol types over which the arrangement may communicate. At a process 504, the protocols to be used during operation may be set by an operator interfacing with the dual-mode arrangement, may be set by a remote server connected to the dual-mode arrangement over a network, or through other techniques. In some embodiments, at the process 504, the dual-mode arrangement opens an uplink and listens for targets communicating signals according to different protocols and identifies the protocols through data contained in various uplink signals. In some embodiments, the dual-mode arrangement sends out request signals under different protocols (including at different frequencies) to request any devices according to the particular protocol respond.

In any event, at process 506, the dual-mode arrangement assesses any of a number of different types of data and determines a length of each time period associated with each protocol. The assessed information may include protocol-specific information, such as the type of protocol, and/or target-specific information, such as the number of targets for each protocol or the locations of the targets for each protocol. The process 506 determines the length of the time periods, whether there is to be a spacing time between each of the time periods, the ordering of the time periods, and whether the time periods are to automatically start/stop or whether the time periods may start/stop based on triggering events, as discussed herein.

After the setup process 502, the dual-mode arrangement enters an operating process 508, in which the dual mode arrange activates its transceiver to enter a first protocol time period, at a process 510. The transceiver, which is a dual-mode transceiver, is instructed by a dual-mode controller, to only send signals to and/or receive signals from first protocol targets according to the first protocol over this first time period, which it does at process 512. During the process 512, the dual-mode control prevents the dual-mode transceiver from sending or receiving communications from second protocol targets. Correspondingly, at a process 514, the dual-mode controller controls the dual-mode transceiver to stop sending and/or receiving signals of the first protocol over the first time period. Instead, at a process 516, the dual-mode transceiver is entered into a second time period and second protocol, in which, at a process 518, the dual-mode controller is made to send signals to and/or receiver signals from second protocol targets. During the process 518, the dual-mode controller controls prevents the dual-mode transceiver from sending or receiving communications from first protocol targets.

Figure 6:
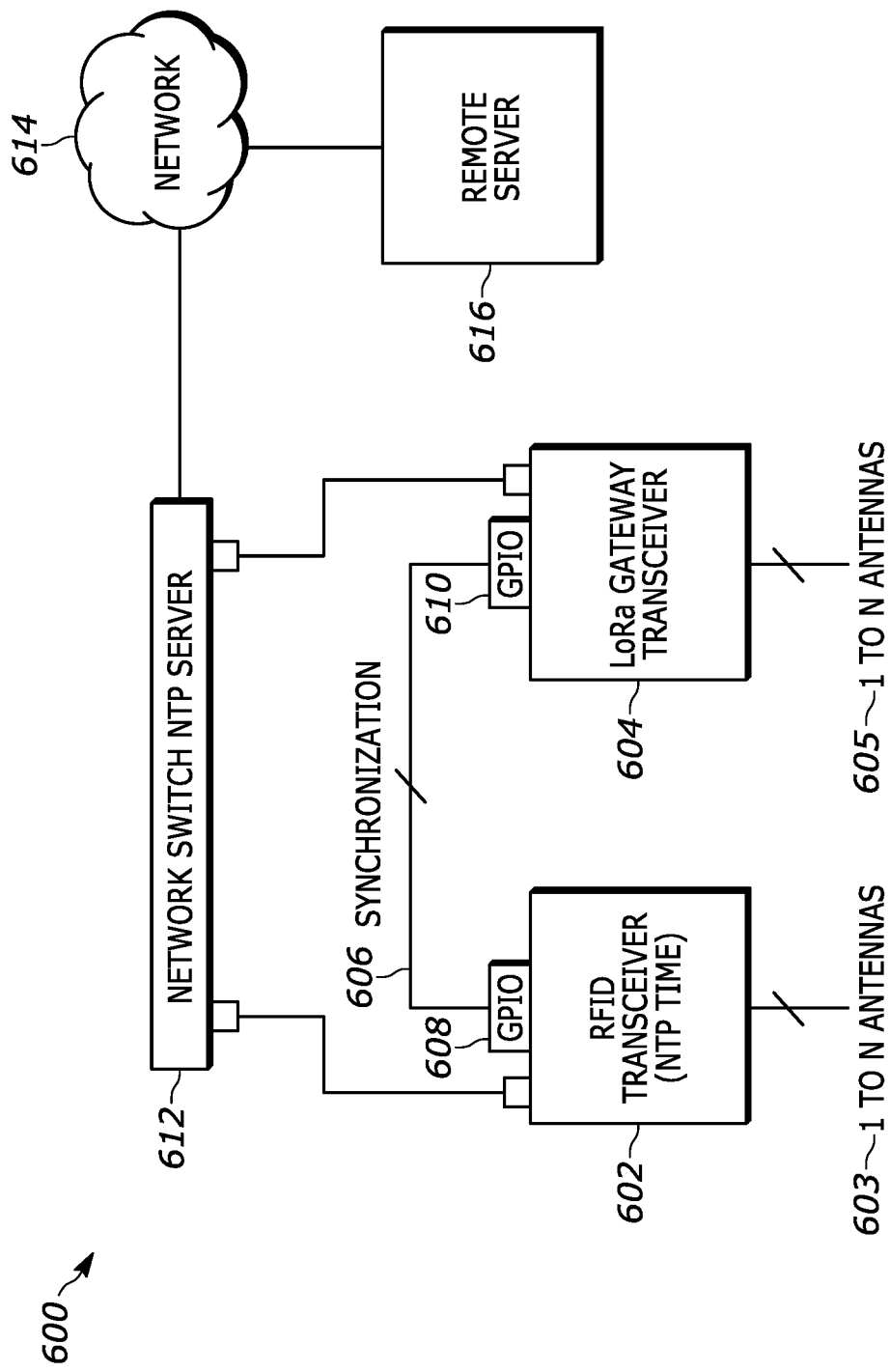
FIG. 6 is a block diagram of a detailed example of another logic circuit as may be implemented by the logic circuit of FIG. 2.

The present techniques for dual-mode in-band communications may be implemented in other ways. FIG. 6 is a block diagram of another example implementation of the processing platform 200 of FIG. 2, in particular a block diagram representation of the dual-mode transceiver 210 and dual-mode controller 212 of FIG. 2, with the processing platform 200 configured to operate according to an RFID protocol and a LoRa protocol. A dual-mode arrangement 600 configured to transmit and receive over different protocols, e.g., over a RFID protocol and a LoRa sensor protocol. Further, the dual-mode arrangement 600 is configured to transmit over these different protocols over different, non-overlapping time periods, such as shown in FIG. 4. However, instead of having an integrated arrangement in which a dual-mode transceiver capable of transmitting/receiving over both an RFID protocol and a LoRa sensor protocol, the arrangement 600 uses two dedicated transceiver devices, an RFID transceiver 602 feeding a first dedicated antenna array 603 and a LoRa gateway transceiver 604 feeding a second dedicated antenna array 605. In the illustrated embodiment, a synchronization link 606, e.g., a wired connection, extends between respective GPIO interfaces 608 and 610 of the RFID transceiver 602 and the LoRa gateway transceiver 604 and is used to synchronize operation between the two.

The configuration of the dual-mode arrangement 600 allows one of the dedicated transceivers 602 and 604 to operate as a master and the other as a slave, where the master transceiver is configured to control switching between the first time period and the first protocol (e.g., the protocol of the master transceiver) through the synchronization link 606. For example, with the RFID transceiver 602 as the master transceiver, the RFID transceiver 602, communicating with a network switch/NTP server 614, may determine when to enter a first time period during which the RFID transceiver 602 is to communicate with RFID tags in range of the antenna array 603. The RFID transceiver 602 communicates a second protocol disable signal to the LoRa transceiver 604 over the synchronization link 606, instructing the transceiver 604 to stop any transmitting or receiving of LoRa signals during the first time period. In this example, the RFID transceiver 602 determines when to end the first time period and enter the second time period. The RFID transceiver 602 stops transmitting and/or receiving RFID signals, stops the first time period, enters the second time period, and sends second protocol enable signal to the LoRa transceiver 604 to commence transmitting and/or receiving LoRa signals. In some examples, the determination of when to start and stop the first and second time periods is determined by a remote server 616 and communicated to the master transceiver over a network 614 communicatively coupled to the network switch/NTP server 612.

The remote server 616 may control a plurality of dual-mode arrangements 600 within a environment, controlling operation of each to set when the dual-mode arrangements 600 enter the first and second time periods respectively. Furthermore, while the dual-mode arrangement 600 is shown with one RFID transceiver paired with one LoRa gateway, in some environments, multiple RFID transceivers may be paired with a single LoRa gateway, and a remote server controls first and second time period operations between each different type of transceiver. Turning to the dual-mode arrangement 300 of FIG. 3, in some environments, there may be many of these arrangements dispersed overhead throughout the environment, each connected to a remote server. The remote server may control the dual-mode arrangements 300 (e.g., by sending executable instructions to configure the dual-mode controller 304 implemented as an SDR) such that some operate as RFID transceivers only and only a subset of the dual-mode arrangements 300 have dual-mode controllers 304 configured to operate in dual-mode communication modes, as described above. The remote server can nonetheless control operation amongst all of the dual-mode arrangements 300, such that even those configured for RFID transceiving only operated according to the same first and second time periods described herein.

Returning to FIG. 6, the dual-mode arrangement 600 is a tethered arrangement that can be configured in different ways. In an embodiment, the RFID transceiver 602 and the LoRa sensor transceiver 604 may be co-located in the same overhead device in a facility, for example. Each transceiver 602, 604 may listen for uplink signals due to some event, and based on that uplink signals trigger one of the transceivers to go quiet (i.e., not transmitter or receiver), while the other transceiver stays hot (e.g., transmits or receives). In an example, upon receipt of a trigger signal on the uplink, the RFID transceiver 602 will enter a second time period (i.e., go quite) for a predetermined period of time (e.g., for 1 second), until the LoRa transceiver 604 is able to downlink (i.e., transmit) an acknowledgement (ACK) signal to the LoRa sensor sending the uplink signal. This allows the LoRa sensor (second protocol target) to receive the ACK signal and stop sending an uplink signal, thereby reducing battery drain on the LoRa sensor. This type of quieting a transceiver to allow for an acknowledgement or other downlink signal can be determined in a transceiver specific manner, based on the location of the transceiver in a facility, globally for all transceivers in a facility, or based on any other number of parameters.

Returning to FIG. 4, in tethered configurations like that of FIG. 6, the RFID transceiver 602 may send a LoRa enable signal 607 over the GPIO interfaces 608 and 610 and through the synchronization link 606 to enable the LoRa transceiver 604 to receive LoRa signals during the time periods 406.

In some embodiments, the RFID transceiver 602 and the LoRa transceiver 604 can share CRC/collision data with each other over the synchronization link 606. In some such embodiments, a transceiver may be quieted, for allowing an ACK or other downlink signal, only when a threshold CRC/collision data value has been met.

Furthermore, synchronization between transceivers 602 and 604 allows for identification of specific problematic channels, i.e., frequency ranges. By sharing channel information over the synchronization link 606, one or both of the transceivers 602 and 604 can identify if a particular channel, e.g., a particular RFID channel is problematic for transmission using the LoRa transceiver 604, in which case the RFID transceiver 602 can be controlled to skip using that channel and instead clear the spectrum for the LoRa transmission.

In some embodiments, the dual-mode arrangement 600 allows for coordinating radio activity with respect to RFID interrogations and LoRa uplink and downlink activities through schedules which are enabled by NTP synchronization of both transceivers 602/604.

It is noted, that in some example embodiments, uplinks are narrower frequency bands (125 KHz bandwidth) and can operate at an acceptable level when arranged between the RFID channels. Whereas, downlinks are typically at 500 KHz bandwidth and will commonly fall on RFID channels, thus the downlink will be more susceptible to interference from RFID.

In some embodiments, the targets and dual-mode targets, such as battery assisted passive (BAP) RFID tags with LoRa sensors. In some embodiments, the dual-model arrangement 600 with listen for uplink signals on both transceiver 602 and 604 and communicate to a controller, either within one of the transceivers, or at the remote server 616 that a particular LoRa sensor has sent an event (i.e., an uplink signal, and that receiving device will select the BAP tag associated with that LoRa sensor and communicate the LoRa ACK signal using the RFID transceiver 602. That is, in some examples, an ACK or other downlink signal for a first protocol (in this case a LoRa protocol) may be sent via a second protocol (in this case an RFID protocol), when the target device is a dual-mode target device able to receive signals on via multiple protocols.

In some embodiments, the LoRa transmitters herein are used configure LoRa sensors by sending a schedule or other instruction to the LoRa sensor, such that the LoRa sensor uplinks only at certain time windows. In some such embodiments, the dual-mode controller may be configured to enter the first time period of the second time period based on these windows.

In some embodiments, the present techniques may be implemented to achieve adaptive RFID channel hop-setting. For example, an RFID signal may be transmitter on a number of different channels, 50 channels out of an allocated 56 channels, in some examples. Since the dual-mode controller 304 in FIG. 3 and the RFID transceiver 602 in FIG. 6 can have knowledge of the LoRa channel plan, a 56 channel RFID hop set can be used to dynamically select the most optimum 50 out of 56 channels according to the LoRa channel plan. By determining over which channels the LoRa uplink signal is received, the RFID transmitter may be made to hop to an optimum subset of available channels to avoid all or some of these LoRa uplink channels.

Furthermore, in examples, where there are a plurality of different dual-mode arrangements, the assigned channels of operation for each of the arrangements may be determined by a remote server or other processing system, coupled to the arrangements over a network. The remote system may coordinate entry into the first time period and second time period across these arrangements as well. In some embodiments, the remote server may control the arrangements to all enter the first time period at the same time and to enter the second time period at the same time. In some embodiments, the remote server may control some of the arrangements to enter a first time period, while other arrangements are in a second time period, such as may occur with arrangements in different locations of a facility operating at different time periods and protocols.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A dual-mode arrangement for in-band communication according to a first protocol and to a second protocol, the arrangement comprising:
   a dual-mode transceiver configured to communicate with targets operating according to the first protocol and configured to receive signals from targets operating in the second protocol; and
   a dual-mode controller coupled to the dual-mode transceiver and configured to operate the dual-mode transceiver to communicate with the targets operating according to the first protocol during a first time period and configured to operate the dual-mode transceiver to receive signals from the targets operating according to the second protocol during a second time period, wherein
   the dual mode controller is further configured to
      operate the dual-mode transceiver as a radio frequency identification (RFID) reader according to the first protocol,
      operate the dual-mode transceiver as a Low Power Long Range (LoRa) gateway according to the second protocol, and
      prevent the dual-mode transceiver from communicating with the targets operating according to the first protocol during the second time period and further configured to prevent the dual-mode transceiver from receiving the signals from the targets operating according to the second protocol during the first time period,
   wherein the targets operating according to the first protocol operate over a first frequency range and the targets operating according to the second protocol operate over a second frequency range that at least partially overlaps the first frequency range.

2. The arrangement of claim 1, wherein the dual-mode controller is configured to establish a length of the first time period and a length of the second time period based on a signal quality of signals communicated according to the first protocol and a signal quality of signals received according to the second protocol.

3. The arrangement of claim 2, wherein the first protocol is a RFID protocol and the targets operating according to the first protocol are RFID tags, and wherein the second protocol is a LoRa protocol and the targets operating according to the second protocol are LoRa sensors.

4. The arrangement of claim 3, wherein the length of the second time period is shorter than an RFID tag energized time.

5. The arrangement of claim 1, wherein the dual-mode transceiver is an ISM band transceiver.

6. The arrangement of claim 1, wherein the dual-mode controller is configured to switch the dual-mode transceiver into either the first time period or the second time period in response to a signal received from at least one of the targets according to the first protocol or one of the targets according to the second protocol.

7. The arrangement of claim 1, wherein the dual-mode controller is configured to switch the dual-mode transceiver into the first time period or the second time period in response to a location at least one of the targets according to the first protocol or one of the targets according to the second protocol in a venue.

8. The arrangement of claim 1, wherein the dual-mode controller is configured to determine a mode of operation of the arrangement and configured to establish a length of the first time period and a length of the second time period based on the determined mode.

9. The arrangement of claim 1, wherein the dual-mode controller is configured to instruct the dual-mode transceiver to communicate, during the first time period, an energize signal to the targets operating according to the first protocol.

10. The arrangement of claim 1, wherein the dual-mode controller is configured to instruct the dual-mode transceiver to communicate, during the first second period, and energize signal to the targets operating according to the first protocol.

11. The arrangement of claim 1, wherein the dual-mode controller has a first protocol and second protocol controller configured to switch the dual-mode transceiver between operation in the first time period and in the second time period, based on at least one parameter of each of the first protocol and the second protocol.

12. A system comprising:
   a plurality of dual-mode transceiver stations within a venue, each dual-mode transceiver station configured to communicate with targets operating according to a first protocol in the venue during a first time period and configured to receive signals from targets operating according to a second protocol in the venue during a second time period, wherein each dual-mode transceiver station is further configured to operate as a radio frequency identification (RFID) reader according to the first protocol, operate as a Low Power Long Range (LoRa) gateway according to the second protocol, and prevent communicating with the targets operating according to the first protocol during the second time period and to prevent receiving the signals from the targets operating according to the second protocol during the first time period; and
   a dual-mode controller coupled to each of the plurality of dual-mode transceiver stations and configured to switch operation of each of the plurality of the dual-mode transceiver stations between the first time period and the second time period in response to a determination of venue-based metrics determined from the targets operating according to the first protocol and/or from the targets operating according to the second protocol in the venue,
   wherein the targets operating according to the first protocol operate over a first frequency range and the targets operating according to the second protocol operate over a second frequency range that at least partially overlaps the first frequency range.

13. The system of claim 12, wherein the dual-mode controller is configured to determine a number targets operating according to the first protocol in a region of the venue as the venue-based metrics.

14. The system of claim 12 wherein the dual-mode controller is configured to determine the number of targets operating according to the second protocol in a region of the venue as the venue-based metrics.

15. The system of claim 12, wherein the dual-mode controller is configured to determine a dead zone region of the venue as the venue-based metrics.

16. The system of claim 12, wherein the dual-mode controller is configured to, in response to changes in the venue-based metrics, switch operating of at least some of the plurality of dual-mode transceiver stations between the first time period and the second time period.

17. The system of claim 12, wherein the dual-mode controller has a first protocol and second protocol controller configured to switch each dual-mode transceiver station between operation in the first time period and in the second time period, based on at least one parameter of each of the first protocol and the second protocol.

\* \* \* \* \*